United States Patent [19]

Ohno et al.

[11] 4,348,463
[45] Sep. 7, 1982

[54] REFLECTOR

[75] Inventors: Akira Ohno; Hitomi Katayama; Suguru Nomura; Susumu Senaha; Suizo Kyo; Susumu Shmomura; Akira Akagami; Hiroshi Imai, all of Yokohama, Japan

[73] Assignees: NHK Spring Co., Ltd.; Yokohama Kiko Co., Ltd., both of Kanagawa, Japan

[21] Appl. No.: 93,554

[22] Filed: Nov. 13, 1979

[30] Foreign Application Priority Data

Nov. 13, 1978 [JP] Japan ................. 53-138905

[51] Int. Cl.$^3$ ............... G02B 5/08; B32B 17/10; B32B 15/08
[52] U.S. Cl. .................... 428/429; 350/288; 350/292; 350/320; 428/412; 428/415; 428/416; 428/426; 428/427; 428/428; 428/432; 428/433; 428/434; 428/446; 428/447; 428/450; 428/457; 428/458; 428/460; 428/463; 428/469; 428/472; 428/913
[58] Field of Search ........... 428/429, 446, 447, 452, 428/450, 411, 469, 472, 432, 433, 434, 913, 426, 463, 412, 457, 427, 458, 415, 416, 428, 460; 350/320, 288, 292; 427/124, 125, 295, 330

[56] References Cited

U.S. PATENT DOCUMENTS

| | | | |
|---|---|---|---|
| 2,519,722 | 8/1950 | Turner | 350/320 |
| 2,676,117 | 4/1954 | Colbert | 350/288 |
| 3,026,177 | 3/1962 | St. Pierre | 350/288 X |
| 3,026,210 | 3/1962 | Coble | 350/288 X |
| 3,398,040 | 8/1968 | Allen | 350/288 X |
| 3,410,636 | 11/1968 | Herrick | 350/288 |
| 3,610,741 | 10/1971 | Davies | 350/320 |
| 3,687,713 | 8/1972 | Adams | 350/288 |
| 3,837,895 | 9/1974 | Pyror | 428/429 |
| 4,009,947 | 3/1977 | Nishida | 350/288 |

FOREIGN PATENT DOCUMENTS

| | | | |
|---|---|---|---|
| 653550 | 12/1962 | Canada | 428/429 |
| 618610 | 7/1978 | U.S.S.R. | 350/320 |

*Primary Examiner*—Ellis P. Robinson
*Attorney, Agent, or Firm*—Sughrue, Mion, Zinn, Macpeak & Seas

[57] ABSTRACT

The reflector of the present invention is the one in which on a substrate are successively arranged a resin layer, preferably, a resin layer having a molar percentage of an aryl group/(alkyl group plus aryl group) is 65-100%, a vacuum deposited layer of a light reflective metal and a light transmissible crystalline ceramic layer in this order. Pinholes or non-smoothness on the substrate is eliminated by disposing the resin layer on the substrate, and a vacuum deposited layer of a light reflective metal having a smooth surface is easily obtained. And on the surface thereof is disposed a vacuum coated layer of the light transmittable crystalline ceramic, and hence, without taking the reflector out of a vacuum depositor, it can be vacuum deposited continuously and its manufacture is very easy. And yet combination of the abovementioned smooth metallic reflecting surface with properties of the crystalline ceramic having very little light refraction or absorption, make it undergo little change of total reflectivity, regular reflectivity and refractivity, resulting in a very clear reflected image or the one having a high precision light collective and light distributing properties. Further, since the outermost layer is a light transmittable crystalline ceramic vacuum deposited layer, the reflector has the properties that there is little loss of transparency or coloring degradation with the time and thermal conductivity is great; thus with the use as an illumination reflector, temperature rise is small and it is heat-, light-, weather- and solvent-resistant.

7 Claims, No Drawings

REFLECTOR

THE DETAILED DESCRIPTION OF INVENTION

The present invention relates to a reflector suitable for use in illumination such as an illumination shade, various optical instruments, the sunlight reflector etc., comprising a light reflecting layer and a ceramic protective layer disposed on a substrate consisting of a metal or nonmetal board with a resin layer disposed thereon.

The conventional reflectors can be roughly classified as follows: Typical are (1) the one in which the surface of metal such as stainless steel or aluminum is subjected to buff polishing, electrolytic polishing or chemical polishing, (2) the one in which the surface of metal such as iron or aluminum is disposed by porcelain, (3) the one in which on the surface or back of glass or transparent resin there is coated metal such as aluminum by vacuum depositing or silver by a silver mirror reaction and (4) the one in which on the surface of the above (1) or (3) there is disposed a transparent resin coating.

However, the one in (1) needs polishing of the surface, in the buff polishing, the finished surface being rough and with the metallic surface alone, it is very difficult to obtain regular reflective ability and it has the disadvantage that in the electrolytic or chemical polishing, a wetting method is needed, there is not only the problem of environmental pollution of chemicals to be used but also the polished surface has no good regular reflective ability but is insufficient to form a light reflective surface.

In the one in (2), the surface subjected to enameling with porcelain has no regular reflective ability at all, smoothness being set aside, but only randomly reflected light or dispersed light can be obtained.

In the one in (3), since the surface is metal, chemical-, weather- and abrasion-resistance is low, and regular reflective ability is good but total reflective ability is no good in the case of the plating by metal such as nickel and chromium. And plating is conducted in the wet method and there is the disadvantage that there is an environmental pollution problem of chemicals to be used, etc.

The one in (4) has been intended to settle the disadvantages of the abovementioned ones and the metallic surface is protected and it is excellent in the high regular reflectivity, whereas the weather-, abrasion-, light- and chemical-resistance of resin becomes a problem. That is, it has the disadvantages that if what is poor in light-, heat-, and weather resistance is used with the time, the surface is colored or loses transparency; if the surface is wiped with a cloth to clean it, rubbed scratches occur; if the resin layer becomes thick, absorption of light and infrared rays becomes great, surface temperature rises and the lowering of physical properties is brought.

The present invention intends to provide a reflector having no such conventional disadvantages.

When a light reflective metal is vacuum deposited on a metallic or nonmetallic substrate, the light reflective metallic coated film forms the same replica film as the metallic or nonmetallic substrate surface, and hence, if there are roughness or pin holes on the metallic or nonmetallic substrate, even vacuum coated film finds it difficult to eliminate them. Accordingly, polishing the substrate surface is needed. For that purpose, many disadvantages as mentioned above occur. In the present invention, a resin layer is coated on a metallic or nonmetallic substrate to bury roughness and pinholes on the substrate and make it smooth a light reflective metal is vacuum deposited to better regular reflectivity, and further on the surface thereof there is particularly disposed a protective film of vacuum deposited layer of a light transmittable crystalline ceramic and thereby there have been able to be eliminated the disadvantages that the conventional resin protective film is poor in heat-, solvent-, weather- and light-resistance.

As metals of the substrate not only are listed metallic simple substances such as iron, stainless steel, copper, brass, bronze, nickel, aluminum and duralumin or the alloys thereof but also a metal plate such as a galvanized or tin-plate sheet, in which the surface is coated with metal will do.

As a nonmetallic substrate are listed various polymeric materials, glass, ceramics, mica, stones, slate, wood, paper, etc.

As resin to be coated on said substrate, a resin film which does not release low molecular weight substances, that is, substances having a high vapor pressure under vacuum and which stands the heat generated at the vacuum coating operation or the heat artificially given will do. As such materials for example, epoxy resin, polyester resin, phenol resin, allyl resin, silicone resin, polycarbonate, urea resin, etc. However, silicone resin and particularly high aryl-silicone resin having good heat resistance and durability is preferable. For instance, the one in which the molar percentage of aryl group/(alkyl group+aryl group) is 65–100% is most preferable.

The high aryl-silicone resin is thermally cured, where the molar percentage of aryl group/(alkyl group+aryl group) of the polyaryl alkyl-silixane is 65–100%, the number of functional groups in polymerizable groups is 2–3 and the number of carbons/number of silicons is 4.25–16, which have been mentioned in an precedent application, Japanese Patent Application No. 38409/78. This silicone resin is obtained by polymerizing a liquid or low melting polyaralkylsiloxane consisting of structural units having the general formula represented below under specific conditions:

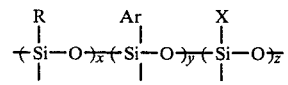

wherein R is a lower (carbon) alkyl radical such as methyl, ethyl and propyl, among which methyl is preferred; Ar is an aryl radical such as phenyl, tolyl, and naphthyl, among which phenyl is preferred; X represents a functional group such as a hydroxy group, an alkoxy group such as methoxy, ethoxy, propoxy and butoxy, or an acyloxy group such as acetoxy, propyloxy and butyloxy which will condense to form a polymer and x, y and z represent the molar proportion for the unit for which they are subscripts, respectively.

The free bonds in the structural formula above may carry one of the aforesaid functional groups or the bonds in two structural units may link to form a bridging bond, provided the following conditions are met: (1) the mole fraction of aryl radicals to the sum of the aryl and alkyl radicals is 0.65 to 1.00, (2) the polymerizable functionality is 2 to 3 and (3) the ratio of the number of carbon atoms to the number of silicone atoms is 4.25 to 16. With the above molar percentage smaller than 65%, there occurs a defect of low heat resistance. That the number of functional groups is set at 2-3 is to simplify coating of resin and to polymerize and cure it by heating after the coating.

As compared with the conventional silicone resin having many alkyl groups, this high aryl-silicone resin has high hardness and the following various kinds of excellent performances:

(1) The high aryl-content not observed in conventional silicone resins,
(2) As compared with the conventional silicone resins having alkyl groups alone or many alkyl groups, this silicone resin is excellent in heat resistance, serviceable at temperature lower than 250° C. for long periods, stands the use with the time at 250°-600° C. unless for long hours. And it is excellent resistance to light-, weather-, chemicals- and water,
(3) It has a sufficient adhesion to the substrate,
(4) It is excellent in vacuum depositing of a light reflective metal and particularly vacuum depositing at high temperatures is almost unparalleled,
(5) As its refractivity is similar to those of glass and quartz, when it is coated on them, there is little coated feeling,
(6) A film colorless and transparent, having a high light transmittability is obtained,
(7) Bending resistance is very high and there are almost no cracks or peeling off of coatings due to bending,
(8) Processibility at manufacture is good and there is little or no environmental pollution problem.

The resin in the present invention has the above-mentioned properties and can be utilized in the heat resistant uses and various new fields in which it was difficult to use the conventional silicone resin having a high content of alkyl groups.

The coatings of these resins are preferably applied without the use of solvent and hardened by heat curing or baking, but if necessary, a method of coating the solution of the resin and evaporating the solvent, electrostatic coating or a method of coating a preliminarily arranged film can be optionally carried out.

As light reflective metals to be vacuum evaporate to form a light reflecting surface of reflector of the present invention, typical are light reflective metals such as aluminum, duralumin, silver, white gold, gold, nickel and chromium but they are not limitative thereto. For instance, copper, etc. are light reflective but when they are used as a simple substance and they combine with oxygen, a carbonic acid gas, water, etc. in the air and very often lose light reflective ability; however, if its surface is protected with a protective film, they are usable. As a method of vacuum depositing on the resin of the substrate a light reflective metal, there are, as mentioned before, vacuum evaporation, sputtering and ion plating methods.

Vacuum evaporation is the simplest method, but since only kinetic energy of metal coating particles in the mean free path is utilized, there is only energy of 0.1 eV or below at most and the penetration of the metal particles in to the substrate is 1 A or less, only a weak coated film can be formed. And since bond strength between the substrate and a metallic film is low and density of the film is small, peel strength is low. The mean free path in said method becomes longer as particle weight of metal is small and degree of vacuum and temperature are high. Accordingly, a metal having a small atomic weight or small atomic diameter is easy to coat, and it is advisable to conduct the coating at a degree of vacuum of at least $10^{-4}$ Torr, preferably $10^{-5}$ Torr or below. One power of 10 difference of the degree of vacuum causes the difference of 10 times of the mean free path, the degree of vacuum is the most important parameter for vacuum depositing.

For example, if in the molten state of ceramic under vacuum, there is the degree of vacuum loss by two power of 10 or above of the set degree of vacuum, control of vacuum evaporation method is difficult and it is difficult to obtain the desired deposited film strength.

On the other hand, temperature contributes to the mean free path by a square root of absolute temperature, it does not become so big a factor.

In the case of use of a light reflective alloy, when mutual metals make a molecular compound or mean free paths or evaporation speeds resemble closely each other, a method of vacuum evaporation can be employed, but if that is not the case, since each metal constituting the light reflective alloy dissociates and is vacuum evaporated separately, a nonuniform or weak film is formed; thus a method of sputtering had better be employed.

The method of sputtering is the one of causing excited particles having kinetic energy faster in speed than in the method of vacuum evaporation to impinge on the substrate and be coated on it. Kinetic energy is several 10-100 eV and more and several A—several 10 A penetrates into the substrate; and consequently, a deposited film high and great in strength and durability as compared with that in the method of vacuum evaporation is obtained and light reflective ability of a metal coated film is considerably good also. And in case of depositing a light reflective alloy, in the method of vacuum evaporation, the depositing is carried out by evaporation of an alloy melt, whereas this method has the advantage that dissociation of components is hard to occur because gases are formed by sublimation from a solid target, and thus, depositing is possible.

However, this method has the disadvantage that since it is inconvenient that depositing materials should be used as a so-called target molded into a special shape such as a circular plate or cylinder, and depositing speed is slow, production efficiency is poor.

A method of ion plating is further classified into several types of method and when using the method having a good efficient depositing, a deposited film with the penetration into the substrate of several 100 A can be obtained by several KeV energy. This method different from the abovementioned two methods does not use neutral particles but cation particles. Since cation particles move by electric voltage acceleration toward the substrate placed in an electric field, that is, a cathode, flying speed becomes faster than in the sputtering method. And since the particles are cations, particle diameter is small and its mean free path becomes longer than in the vacuum evaporation method or the sputtering method.

Typical are the following in the ion plating methods:

(1) Plasma ion plating method

This is to apply an voltage of several 100—several 1000 V between the coating materials and the substrate under a reduced pressure of $10^{-2}$–$10^{-3}$ Torr, conduct glow discharge, ionize evaporating neutral particles in the generated plasma and carry out the coating. The feature of this method is that the ionization rate is several 10% higher and a strong deposited film can be formed and there is the advantage that as particles fly along a line of electric force in the electric field, and back side depositing is possible. However, temperature rise in the cathode is great, heat resistance of the substrate is needed and the mean free path is short, and hence, there is the disadvantage that in coating a large-sized article, one requires contrivance.

(2) RF ion plating method

This is a method of passing evaporated particles through a high frequency oscillating coil, ionizing and depositing them. This method is characterized in that it has the advantage that since glow discharge is not in use, depositing is possible even with a degree of vacuum of $10^{-3}14$ $10^{-4}$ Torr and the temperature rise of a cathode is little, but on the other hand, since an ionization ratio is small and depositing the size more than the diameter of an RF oscillating coil is difficult, there is the disadvantage that coating having a large projected area is hard to produce.

(3) Applied voltage method

This is an applied voltage method in which vacuum depositing is conducted under a reduced pressure of $10^{-4}$–$10^{-5}$ Torr on the same condition as in the plasma ion plating method of (1) above. In the present method, a little or no glow discharge is observed visually, but a cathode current can sufficiently be observed; with the degree of vacuum lower than around $10^{-4}$ Torr and an electric voltage gradient of several 10 V/cm or above, this method is fairly effective. This method has the intermediate characteristics of those of the plasma ion plating method and the vacuum evaporation method.

(4) Method of using ion gun

Methods (1)–(3) ionize particles preliminarily evaporated by resistance heating or an electron beam, are ionized in electric field plasmas or high radio frequency, whereas this method is to conduct direct ionization with a gun.

In this method, typical are an i-gun method and a hollow cathode method in which to use high frequency. In both, ionization efficiency is high and there is the advantage that even in the vacuum system high in the degree of vacuum depositing is possible.

In conducting an ion plating method, it is important to fully take these features into consideration and carry out depositing. Or in case of metal depositing a light reflecting surface colors or becomes turbid in some cases to lower reflectivity.

In case of depositing a light reflective metal, to improve light reflective ability it is necessary to remove a reactive gas such as air as much as possible. Otherwise, total reflectivity drops or the light reflecting surface colors or discolors in some cases.

As a light transmittable crystalline ceramic to be vacuum deposited on the light reflective metal vacuum deposited layer, typical are ceramics of oxide series such as alumina, magnesia, zirconia and spinel ceramic, iolite ceramics such as cordierite, high alumina and mullite ceramics, zircon ceramics, lithia ceramics such as pyroceram, steatite ceramics, titanium oxide ceramics, etc. However, a crystalline protective film obtained by vacuum depositing may be a ceramic which becomes light transmittable and is not limitative to the above-mentioned ceramics.

Its selection is according to the purpose of use of the reflector. For example, if heat resistance and acid resistance are needed, an oxide ceramic and a high alumina and mullite ceramic are desirable, and when alkali resistance is needed, ceramics of fayalite, serpentine, etc. are preferable and when heat resistance is needed, an iolite ceramic, a lithia ceramic and so forth are better, and particularly when thermal expansion and shrinkage requires to be small, a lithia ceramic such as pyroceram, etc. are preferably used.

Vacuum depositing of a crystalline ceramic can be made with the same device as that of vacuum depositing of the above light reflective metal. However, operations for a light reflective metal and a crystalline ceramic considerably differ from each other.

First, energy needed for melting, sublimation and evaporation of a crystalline ceramic is very high as compared with that of a light reflective metal. Accordingly, in case of any depositing methods, the time for depositing crystalline ceramics becomes long as compare with that in case of a light reflective metal, and in methods of carrying out gasification and ionization as well, crystalline ceramics are more restrictive. For example, many of light reflective metals can be melted and gasified by resistance heating using a high melting metal, but for most crystalline ceramics, resistance heating cannot be employed but an electron beam or ion beam should be employed for their gasification.

Secondly, since a light reflective metal has a great thermal conductivity, if part of it is heated, the whole metal is uniformly heated and melted, but as for a crystalline ceramics, only the heated portion and its neighborhood are often melted. As a crystalline ceramic to be used in the present invention has vacuum depositing characteristics different from a metal, vacuum depositing should be carried out with this point as well in mind. As its typical example, in case of ordinary coating of alumina, the film often becomes yellow or in an extreme case blackish brown, but in the present invention, in such a case, by the full supply of oxygen or by a reaction coating with oxygen, this problem has been successfully solved and a colorless, transparent deposited film has thereby been obtained.

Thirdly, since the mean free path of ceramics is shorter than that of metals in many cases, severer conditions of a high degree of vacuum, or high temperature, a high ionization ratio, etc. than in light reflective metals should be carried out, in case of other conditions are same. For example, aluminum can be vacuum deposited even by the order of $10^{-4}$ Torr, but it is hard for silicon dioxide to bring a satisfactory deposited film, unless it is vacuum deposited in the order of degree of vacuum of $10^{-5}$ Torr. In the case of sputtering, ceramics are by far slower than light reflective metals in depositing speed. In the case of ion plating, ionization of ceramics is hard as compared with in a light reflective metal, and as the coated substrate, that is, the cathode is insulated, ion plating is likely to be hard to conduct. This is particularly the case in case of the ion plating method in which cathod voltage is high and an ion current is great as in a plasma ion plating.

In such a case, a considerable improvement is obtained by not using the substrate as a cathode and by preparing a cathode in which a metal net is arranged in the neighborhood of the substrate. In case of a plasma ion plating method, applied voltage is maintained to from ionization voltage or above to ordinarily about 10 KV or below, and depositing is conducted at least at a reduced pressure of $10^{-3}$ to 1 Torr, and preferably, in the order of a reduced pressure of $10^{-2}$ Torr. If the degree of reduced pressure is too high, glow discharge will fail to occur or the cathode dark space will disappear, whereas if the degree of reduced pressure is to low, arc discharge or spark discharge will occur to disadvantage in some cases. In case an ion generating device such as RF ion plating, a high frequency ionization gun and a hollow cathode is used, depositing is possible some times even at a degree of vacuum up to the highest $10^{-4}$ Torr. When an ionization ratio is sufficiently high, the mean free path of substance particles becomes longer than in case of vacuum evaporate and if applied voltage becomes greater, the mean free path becomes further longer; thus, the advantage of ion plating is that even with the low degree of reduced pressure, depositing is possible.

However, since the ionization voltage of ceramics is great and the mean free path is short, it is advisable that plasma ion plating of as high excitation voltage as possible be carried out, or a hollow cathode or high frequency ion gun be used. If in this case materials which differ too much from each other in the mean free path or an ion rate, a film surface loses transparency or discolors and a deposited film becomes a nonuniform composition in some cases; it is desirable that as chemically uniform materials as possible be used. And since sometimes oxygen defect occurs, it is preferable to conduct depositing in an oxygen atmosphere.

The thus obtained reflector can demonstrate high durability immediately after the completion of the preparation, but it is usually allowed to (1) stand for several days at room temperature, (2) it is heated for several 10 minutes to several hours below a heat distortion temperature, (3) durability can be increased by conducting aging such as repeating several times heating and cooling below a heat distortion temperature.

The features of a light transmissible ceramic protective film are that ceramics are crystalline whereas silica, glass, etc. are amorphous. Thus, the properties differ and a vacuum deposited ceramic film has the following excellent features as compared with a vacuum deposited film of silica, glass, etc.

(1) It is difficult to conduct uniform depositing for silica, glass, etc. having deep dents or complicated shapes, but in vacuum depositing of ceramics, uniform depositing can be conducted very easily for the above materials as well.

(2) In accordance with environment of use, appropriate ceramics can be selected or according to the kind of ceramic or quality of a substrate the one having good affinity can be chosen to obtain by vacuum depositing a highly dense light transmittable protective film, superior in tackiness and impermiable to solvent, water, chemical solutions, etc. Hence, the durability of a reflector is also excellent.

(3) A vacuum depositing layer of ceramics can not only act only as a protective layer to give strength of a reflector but also give other properties. For example, as a ceramic having a low degree of oxidation is sometimes electrically conductive, it can be given antifog properties by applying an electric current thereto and it is easy to let them have functional ability of light translucency and random reflection.

(4) To color silica, glass, etc. it is necessary to add other colorants, but ceramics can be self-colored easily. Accordingly, variously colored reflectors can be easily obtained by vacuum depositing of a natural colored ceramic.

The reflector of the present invention has the following excellent features:

(1) Resins are coated on the surface of a metal or nonmetal substrate to improved pin holes or other roughly surfaces on the metal surface and consequently, polishing of the substrate surface is not needed and on the surface of that can be directly formed a smooth light reflective metal layer by vacuum depositing.

(2) The light reflective metal and a crystalline ceramic are attended by vacuum deposited and can be continuously conducted with the same apparatus, resulting in easy preparation.

(3) Since a crystalline ceramic is vacuum deposited, unlike the case of using the conventional resin coating, it can form a thin film of the same replica as a light reflective metal film, light refraction or absorption by a protective film is very little and changes of total reflectivity, regular reflectivity and refractivity are little. What is more, there is little loss of transparency or coloring degradation with the time which has been the case with a resin protective layer.

(4) The light transmittable ceramic layer excels in heat-, light-, weather- and solvent-resistance, and as its surface is highly dense, even if it is used with the time and polluted with oils, it is not corroded and yet there are few rubbed scratches even by wiping pollutants; thus the layer can stand long-time use. It also has good resistance to oil and abrasion.

(5) The abovementioned light transmittable ceramic film can be a thin film obtained by vacuum depositing as compared with a resin film and has a high heat conductivity; thus in using it as a reflector for lighting fixtures, temperature rise in the coated film is small.

(6) By mounting an even resin layer on the substrate, the regular reflective ability of a light reflective metal vacuum deposited on that layer can be fully developed to obtain an excellent reflector which had a very clear reflected image or high precision light collection and distribution properties by combination with any optional reflecting surface curvature.

Further, the layers referred to in the present invention are not restricted to a layer consisting of a single material. For example, the vacuum deposited layer of a light reflective metal may consist of a laminate of two kinds of metal such as copper and aluminum, and a light transmittable crystalline ceramic layer may consist of a laminate of two kinds of crystalline ceramic.

EXAMPLE 1

A stainless steel sheet, 0.03 cm thick and 25 cm$^2$ was degreased, washed and dried. Then, a solution of an epoxy resin was coated and cured by heating. This was placed in a bell jar in a vacuum depositer held at a distance of 30 cm from a hearth liner right above, and in parallel with, the same; the degree of vacuum was reduced to $2 \times 10^{-5}$ Torr and thereafter heating with an electron beam, nickel was evaporated in the air atmosphere; vacuum depositing was conducted for 30 seconds at a substrate temperature of 150° C. under the conditions of an applied voltage of $-3$ KV, an EB output power of 2.5 KW, and a coating pressure of $4 \times 6 \times 10^{-5}$ Torr, as shown in 1 in Table 2.

Subsequently, the degree of vacuum in the bell jar was reduced to $2 \times 10^{-5}$ Torr, and then oxygen gas was introduced and pressure was raised to $5 \times 10^{-3}$ Torr. And again the pressure was reduced to $2 \times 10^{-5}$ Torr. The same procedure was repeated twice and then in the oxygen atmosphere mullite was evaporated by heating with an electron beam and vacuum depositing was conducted for 5 minutes at a substrate temperature of 150° C., under the conditions of an applied voltage of $-0.7$ KV, an EB output power of 1.5 KW and an coating pressure of $7-9 \times 10^{-5}$ Torr, as shown in 1 in Table 2.

On making a heat test in a constant temperature bath of 150° C. about the reflector having the thus obtained light transmittable mullite protective film, it was discovered that there was no abnormal change, it was a reflector having a high heat resistance, and yet there was no damage sustained even with strong rubbing with gauze, ther was no peeling by the cellotape peeling test; abrasion resistance and adhesion were all excellent. And there was no corrosion under the pollution with organic solvents or oils; solvent- and oil-resistance being strong, the product is suitable as an interior decoration mirror and a ceiling light reflective mirror.

EXAMPLE 2

On an aluminum plate, 0.1 cm thick and 10 cm² was coated a phenol resin and cured by heating. This was held at a distance of 4 cm from a high frequency oscillating coil 10 cm in diameter and 10 cm in height arranged at a distance of 8 cm right above the hearth liner within a bell jar of a vacuum depositer; the degree of vacuum was reduced to $1 \times 10^{-5}$ Torr and an argon gas was introduced and the pressure was raised to $5 \times 10^{-3}$ Torr and then reduced again to $1 \times 10^{-5}$ Torr the same procedure being repeated twice. Aluminum was evaporated by heating with an electron beam under the conditions of an applied voltage of $-1.5$ KV, an EB output power of 1.5—2 KW, and a depositing pressure of $5-6 \times 10^{-4}$ Torr as shown in 2 in Table 2 in the argon gas atmosphere, RF output power being 350 W, frequency being 13.56 MHz and the substrate being at room temperature. The evaporated particles were passed through a high frequency oscillating coil and depositing was carried out for 30 seconds.

Then, after the degree of vacuum was reduced to $1 \times 10^{-5}$ Torr, an oxygen gas was introduced, the pressure was raised to $5 \times 10^{-3}$ Torr and then reduced again to $1 \times 10^{-5}$ Torr, the same procedure being repeated twice. Alumina was deposited for 5 minutes by the same procedure as above in the oxygen atmosphere under the conditions of an applied voltage of $-0.7$ KV, an EB output power of 1.5 KW and a depositing pressure of $4-5 \times 10^{-4}$ Torr as shown in 1 in Table 2.

On carrying out a heat test in a constant temperature bath of 150° C. about the reflector having the thus obtained colorless tranparent alumina protective film, it was discovered that there was no change of the surface as well as reflectivity and high heat resistance was seen after it was let stand for 5 days at room temperature in the highly humid environment of a relative humidity of 90%. Moreover, there was no peeling according to the cellophone tape test, there were no rubbed scratches by strong rubbing with gauze; adhesion and abrasion resistance were all excellent. And it was ascertained that as compared with a reflector in which on the aluminum given a conventional chemical polishing, silicon dioxide was coated by a wet method or the alumite-processed one, this reflector excelled slightly in total reflectivity but much in regular reflectivity. Accordingly, this is most suitable as a reflector for lighting fixtures in which regular reflection property is required, and there is no corrosion by pollution with organic solvents or oils, solvent-and oil-resistance is high; the reflector is suitable as a ceiling light reflective mirror and an interior decoration mirror.

EXAMPLES 3 AND 4

A portion 15 cm² was cut off from a commercially available glass plate 0.2 cm thick and on the other hand, a brass sheet 0.15 cm thick was processed by drawing into a shape of a paraboloid reflective shade 30 cm in diameter and 15 cm in height, polished with buff, degreased, washed and dried. To each substrate was applied a high aryl silicone resin having 83.6 mole% of phenyl groups/(methyl groups+phenyl groups) and cured by heating. The thus resin coated material was placed in bell jar in a vacuum depositer. In Example 3, the material was positioned at a distance of 30 cm from a hearth liner, right above, and in parallel with, said liner. On the other hand in Example 4, the base of the paraboloid reflective shade was maintained at a distance of 20 cm from the hearth liner in parallel with said liner. Then a degree of vacuum was reduced to $2.5 \times 10^{-5}$ Torr in either case, and then chrome in Example 3 and aluminum in Example 4, were evaporated by heating with an electron beam in the air atmosphere. Under the conditions of an applied voltage of $-2$ KV, an EB output power of 0.5-0.7 KW, a depositing pressure of $1.5-2 \times 10^{-5}$ Torr for 20 seconds as shown in 3 in Table 2, and under the conditions of an applied voltage of $-3$ KV, and EB output power of 2 KW, a depositing pressure of $6-7 \times 10^{-5}$ Torr for 30 seconds as shown in 4 in the same Table 2, vacuum depositing was conducted, respectively. The temperature of the substrate was 150° C. in Example 3 and room temperature in Example 4 at the time of depositing.

Afterwards, a degree of vacuum within the bell jar was changed to $1 \times 10^{-5}$ Torr and an oxygen gas was respectively introduced, the pressure being raised to $5 \times 10^{-3}$ Torr and again reduced to $1 \times 10^{-5}$ Torr. The same procedure was repeated twice, and then with a substrate heated to 180° C., under each specified condition of an applied voltage of $-0.7$ KV, an EB output of 1-1.2 KW, a depositing pressure of $8-10 \times 10^{-5}$ Torr in Example 3 and under that of an applied voltage of $-1$ KV, an EB output of 1.5 KW and a depositing pressure of $8-9 \times 10^{-5}$ Torr in Example 4 as given in Table 2, an electrolytically molten spinel in Example 3 and alumina in Example 4 were evaporated with an electron beam and vacuum deposited for 5 minutes, respectively.

On making a heat test for the obtained 4-layered reflector and reflective shade in a constant temperature bath of 180° C., it was discovered that there was no change of surface color as well as reflectivity and it was a reflector having high heat resistance. And with dipping of the reflector in city water for 3 days, the same result as above was obtained. With an angle of depositing at the time of vacuum depositing optionally set at 0°-50°, a light transmittable protective film of the same features was obtained and there was no peeling by checkerboard test, showing excellent tackiness of 100/100. And there was no corrosion from pollution of organic solvents or oils. The reflector had high solvent resistance and oil resistance. The one in Example 3 is most suitable to an interior mirror of a show room or show window, and on the other hand, the one in Example 4 is suitable to a reflective shade of interior lighting fixtures.

EXAMPLE 5

A thermosetting polyester resin board 0.1 cm thick and 10 cm² which was cured by heating with the coating to the whole of a high aryl silicone resin having 83.6 mole % of a phenyl group/(methyl groups+phenyl groups) was held in the substrate holder in the sputtering device, and as the other target was used board-like aluminum. A distance between the substrate and the target was set at 20 cm and the degree of reduced pressure within a bell jar was evacuated to $3 \times 10^{-6}$ Torr, and then argon gas was introduced to raise pressure to $1 \times 10^{-3}$ Torr. With the shutter closed, cleaning sputtering was carried out for 10 minutes at an output power of 4.5 KW and a high frequency of 13.56 MHz to clean the surface of the target and to stabilize discharge. Later the shutter was opened and sputtering of aluminum was conducted for 5 minutes.

Then, an alumina target was employed and temperature within the bell jar was set at 150° C. and baking by heating was given. Afterwards, under the same conditions as above, cleaning sputtering was done for 10 minutes and then the shutter was opened, sputtering of alumina being conducted for 100 minutes. Thus obtained reflector having an alumina transparent protective film was dipped in city water for 5 days resulting in there being no abnormal change on the surface. And with hard rubbing with gauze, there were no scratches, water- and abrasion-resistance being excellent. By using it as a full-length glass to be disposed in a highly humid environment such as a public bath house or bathroom, it is hard to break as compared with the conventional glass mirror and even if it is broken, broken pieces will not scatter, resulting in secured safety.

EXAMPLE 6

A stainless steel plate 0.03 cm thick, and 40 cm² was degreased, washed and dried, and then a high aryl silicone resin having 83.6 mole % of a phenyl group/(methyl groups+phenyl groups) was coated on it and cured by heating. This resin-coated plate was placed in a bell jar of a vacuum depositer and held on, and in parallel with, a hearth liner at a distance of 42 cm therefrom. The degree of vacuum was set at $2 \times 10^{-2}$ Torr, then an argon gas was introduced, the pressure was raised to $2 \times 10^{-5}$ Torr. After the same procedure was repeated twice, in an argon atmosphere, with the substrate of normal temperature, under the conditions as shown in 6 in Table 2, of an applied voltage of $-2$ KW, a resistance heating output power of 100 A and a coating pressure of $2-3 \times 10^{-2}$ Torr, glow discharge was carried out in a bell jar to clean the substrate surface and stabilize the discharge; then aluminum was evaporated by resistance heating, and for 10 seconds plasma ion plating was done.

Later the degree of vacuum in the bell jar was again reduced to $2 \times 10^{-5}$ Torr and an oxygen gas was introduced; the pressure was raised to $5 \times 10^{-3}$ Torr and the same procedure as above was repeated twice, and under the conditions as shown in 6 in Table 2, of an applied voltage of $-0.3$ KV, an EB output power of 0.6–1 KW and a depositing pressure of $6-8 \times 10^{-5}$ Torr, alumina was evaporated by heating with an electron beam and for 5 minutes vacuum depositing was carried out.

On carrying out a heat test for the thus obtained reflector in a constant temperature bath of 180° C., it was found that there was no change of reflectivity or discoloration of the surface and it was a highly heat resistant reflector. And even with the immersion of it in city water for 3 days the reflector had the same results as above. This reflector excelled the reflector in which silicone dioxide was coated by the wet process on the aluminum processed with alumite or given chemical polishing, slightly in total reflectivity but greatly in regular reflectivity.

The obtained reflector is very high in regular reflectivity as compared with a glass back surface-coated mirror which so far has been used as a reflector for the solar heat collector. Moreover, it has the advantages that it is light in weight, easy to transport and mold and hard to break on impact. It can be used very advantageously as a reflectors of the solar heat collectors.

In Table 1 listed are the embodiments of the present invention and in Table 2 listed are the conditions in each embodiment of the present invention.

TABLE 1

| | Multi-layer-coated reflector of the present invention | | | |
|---|---|---|---|---|
| Layer | | | Four layers | |
| Number | Materials | | 1 | 2 |
| 4 Protective film | Inorganics (vacuum deposited) | | | |
| 3 Metal | Metal (vacuum deposited) | | O | O |
| 2 Resin layer | Resin | | O | |
| 1 Substrate | Nonmetal or metal | | O | O |

Note.
O stands for general materials (resin containing no high aryl silicone resin).
 stands for a high aryl silicone resin.
 stands for ceramic materials.

TABLE 2

| Layer | | Working conditions of multilayer-coated reflector of the present invention | | | | | |
|---|---|---|---|---|---|---|---|
| | | 4 layers | | | | | |
| No. | Materials | 1 | 2 | 3 | 4 | 5 | 6 |
| 4 Protective film | Inorganics | Mullite | Alumina | Electrolytically melted spinel | Alumina | Alumina | Alumina |
| | Atmosphere | Oxygen | Oxygen | Oxygen | Oxygen | Argon | Oxygen |
| | Applied voltage | $-0.7$ KV | $-0.7$ KV | $-0.7$ KV | $-1.0$ KV | | $-0.3$ KV |
| | EB output | 1.5 KW | 1.5 KW | 1.0–1.2 KW | 1.5 KW | | 0.6–1 KW |
| | Depositing pressure, | $7-9 \times 10^{-5}$ Torr | $4-5 \times 10^{-4}$ Torr | $8-10 \times 10^{-5}$ Torr | $8-9 \times 10^{-5}$ Torr | $1 \times 10^{-3}$ Torr | $6-8 \times 10^{-5}$ Torr |
| | Time | (5 minutes) | (5 minutes) | (5 minutes) | (5 minutes) | (100 minutes) | (5 minutes) |
| 3 Metal | Light reflective metal | Nickel | Aluminum | Chrome | Aluminum | Aluminum | Aluminum |

TABLE 2-continued

Working conditions of multilayer-coated reflector of the present invention

| Layer No. | | Materials | 1 | 2 | 3 | 4 | 5 | 6 |
|---|---|---|---|---|---|---|---|---|
| | | Atmosphere | Air | Argon | Air | Air | Argon | Argon |
| | | Applied voltage | $-3$ KV | $-1.5$ KV | $-2$ KV | $-3$ KV | | $-2$ KV |
| | | EB output | 2.5 KW | 1.5–2 KW | 0.5–0.7 KW | 2 KW | | Resistance heating output 100A |
| | | Depositing pressure, time | $4\text{–}6 \times 10^{-5}$ Torr (30 seconds) | $5\text{–}6 \times 10^{-4}$ Torr (30 seconds) | $1.5\text{–}2 \times 10^{-5}$ Torr (20 seconds) | $6\text{–}7 \times 10^{-5}$ Torr (30 seconds) | $1 \times 10^{-3}$ Torr (5 minutes) | $2\text{–}3 \times 10^{-2}$ Torr (10 seconds) |
| 2 | Resin layer | Resin | Epoxy resin | Phenol resin | High aryl silicone resin | High aryl silicone resin | High aryl silicone resin | High aryl silicone resin |
| 1 | Substrate | Nonmetal | | | Glass sheet | | Polyester resin | |
| | | Metal | Stainless steel | Aluminum | | Brass plate mold Flood light projector shade | | Stainless steel |
| | | Vacuum depositing method | Applied voltage method | R.F. ion plating method | Applied voltage method | Applied voltage method | Sputtering method | Plasma ion plating subjecting alumina to applied voltage method |

What is claimed is:

1. A reflector comprising a resin layer disposed on a substrate surface capable of withstanding a vacuum deposition, operation of a light metal reflective layer and a crystalline ceramic layer thereon, said resin layer consisting essentially of a hard, abrasion-resistant, bending resistant, thermosett resin which in the form of a film has a high heat resistance, does not release low molecular weight substances under vacuum and withstands the heat generated during a vacuum deposition operation of a ceramic material, a vacuum deposited layer of a light reflective metal disposed on the resin layer and a vacuum deposited layer of a light transmittable crystalline ceramic further disposed on the reflective metal layer.

2. A reflector as set forth in claim 1 wherein said resin layer comprises silicone resin is obtained by polymerizing a liquid or low melting polyaralkylsiloxane consisting essentially of structural units having the general formula represented below:

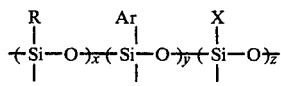

wherein R is lower alkyl radical; Ar is an aryl radical; X represents a functional group which will condense to form a polymer and x, y and z represent the molar proportion for the unit for which it is a subscript, respectively, the free bonds in the structural formula above may carry one of the aforesaid functional groups or the bonds in two structural units may link to form a bridging bond, and wherein (1) the mole faction of aryl radicals to the sum of the aryl and alkyl radicals is 0.65 to 1.00, (2) the polymerizable functionality is 2 to 3 and (3) the ratio of the number of carbon atoms to the number of silicon atoms is 4.25 to 16.

3. A reflector as set forth in claim 1 wherein said light transmittable crystalline ceramic brings only the loss of degree of vacuum within 100 times or below the set degree of vacuum in the molten state of ceramic under a vacuum of $10^{-1}\text{–}10^{-5}$ Torr.

4. A reflector as set forth in claim 1 wherein said ceramic layer is formed from a crystalline ceramic starting material.

5. A reflector as set forth in claim 1 wherein the vacuum deposited ceramic layer is formed from a crystalline substance.

6. A reflector as set forth in claim 1 wherein the ceramic material is a ceramic oxide.

7. A reflector as set forth in claim 1 wherein the ceramic material is alumina, magnesia, zirconia or spinel, an iolite ceramic, a high alumina or mullite ceramic, a zircon ceramic, a lithia ceramic, a steatite ceramic or a titanium oxide ceramic.

* * * * *